July 16, 1946.  J. R. NORTON  2,404,084

BEARING

Filed June 8, 1945

INVENTOR:
John Richard Norton

BY *Lindsey & Robillard*
ATTORNEY.

Patented July 16, 1946

2,404,084

UNITED STATES PATENT OFFICE 2,404,084

BEARING

John Richard Norton, West Hartford, Conn.

Application June 8, 1945, Serial No. 598,247

5 Claims. (Cl. 308—174)

This invention relates to bearings and more particularly to an improved type of bearing designed to receive both radial and thrust loads.

An aim of the invention is to provide an antifriction device in the form of an improved roller and thrust bearing combined into a single self-contained compact unit which may be manufactured from a minimum of parts, which may be interchangeable with standard stock sizes of bushings, and which may be easily assembled in the mechanism in which it is to be used.

A further object of the invention is to provide an improved combination radial and thrust bearing having rollers for taking the radial load and bearing balls for taking the thrust load and in which a minimum of parts is employed to maintain the rollers and bearing balls in position.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
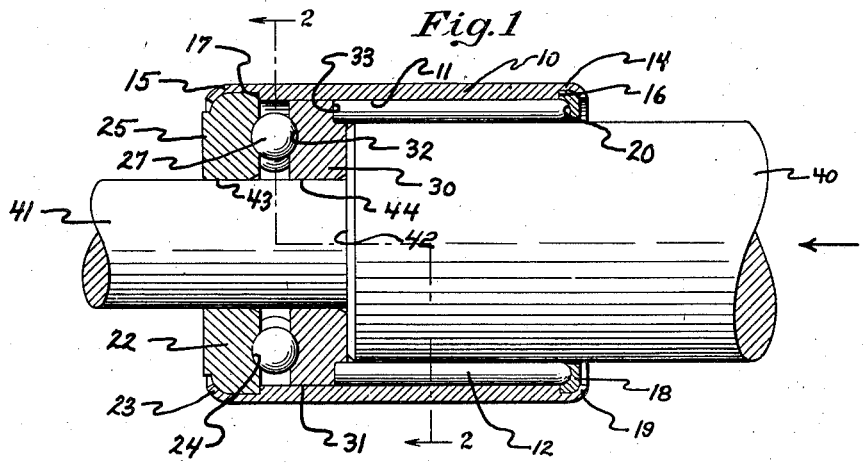
Figure 1 is a longitudinal sectional view of one embodiment of my improved bearing shown with a shaft in place within the unit.
Figure 3:
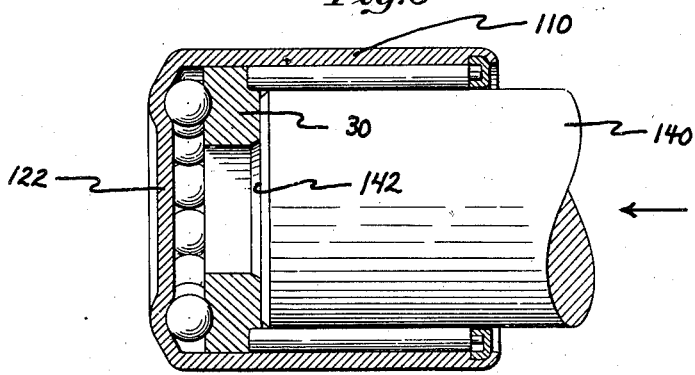
Fig. 3 is a longitudinal sectional view of a somewhat different embodiment of my invention shown positioned on the end of a shaft.

Referring to the illustrative drawing, it will be seen that my improved unit comprises generally a shell with an internal cylindrical surface forming a raceway for a series of rollers; a flange which, in the embodiments shown in the present illustrative drawing, is in the form of a retaining ring provided with a groove for accommodating the outer adjacent ends of the rollers; a bearing race fixed to and carried by the other end of the shell, this race in the embodiment shown in Fig. 1 comprising a separate piece 22 fixed in position and in the embodiment shown in Fig. 3 comprising an integral end wall 122 of the shell 110; bearing balls associated with the race; and a complementary race engaging the bearing balls and having a cylindrical peripheral surface in bearing relation to the internal surface of the shell so that the race may rotate with respect to the shell and shift longitudinally thereof, and so arranged as to support the adjacent inner ends of the rollers against inward radial movement when a shaft is not in place within the unit.

Figure 2:
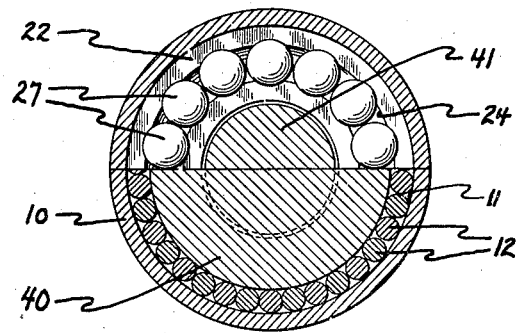
Fig. 2 is a transverse sectional view taken along line 2—2 of Fig. 1.

More particularly, the embodiment of my invention shown in Figs. 1 and 2 comprises a cylindrical sleeve or shell 10 with its internal surface forming a raceway 11. The shell 10 has opposite end portions 14 and 15 of reduced thickness and there are provided outwardly facing internal shoulders 16 and 17 at the inner ends of the reduced portions 14 and 15, respectively. A series of needles or rollers 12 are disposed around the internal surface of shell 10 in engagement with raceway 11. Positioned against shoulder 16 is a roller retaining ring 18 secured in place by an inwardly extending flange or lip 19 which is formed by bending the outer end of reduced portion 14 of shell 10 inwardly into engagement with retaining ring 18. Retaining ring 18 has an inwardly directed groove 20 for maintaining the outer adjacent ends of the rollers 12 against radial displacement when a shaft is not in place within the unit.

At the other end of shell 10 is a ball race member 22 resting against shoulder 17, fixed in position by an inwardly extending flange or lip 23 at the end of reduced portion 15 and having an inwardly facing ball race 24. Member 22 projects beyond the edge of lip 23 to provide a shoulder 25 which provides a position and square seat when bearing is pressed into positon in the mechanism. The bearing is further provided with a disk member 30 slidably mounted in shell 10 and with its periphery forming a cylindrical surface 31 in bearing relation to raceway 11 so that the disk may rotate with respect to the shell. Disk 30 has a ball race groove 32 complementary to ball race 24 and a series of balls 27 are positioned therebetween. A circumferential rabbet 33 on disk 30 is adapted to receive the inner adjacent ends of rollers 12 and to prevent radial displacement of the rollers when the bearing is not positioned on a shaft.

The embodiment of my invention in Figs. 1 and 2 is shown as mounted on a shaft 40 which has a reduced portion 41 and a shoulder 42. Ball race 22 and disk 30 are provided with central bores 43 and 44, respectively, through which portion 41 of the shaft 40 extends. Shoulder 42 bears against disk 30 and it will thus be seen not only that shaft 40 rotates freely in engagement with rollers 12 which reduce to a minimum the friction of the radial load, but also that the friction of the thrust load in the direction of the arrow shown in Fig. 1 is reduced to a minimum since disk 30 rotates against balls 27.

Another embodiment of my invention is illustrated in Fig. 3 and is substantially similar to that shown in Fig. 1 except that the shell is a cup-shaped member 110 and the bearing ball race 122 is an integral end wall of the shell 110 which, as shown in Fig. 3, fits over a shaft 140, the end 142 of which bears against disk 30. This type of bearing is designed to receive the lateral force and longitudinal thrust of the end of a shaft, to retain the lubricating medium employed, and to prevent the entry of dust and dirt into the bearing.

It can be seen from the foregoing description that my improved bearing is of simple construction and easy to manufacture. It has a minimum of parts and may be constructed of steel, bronze, and/or other suitable materials in standard stock sizes. The shell or casing supports and houses the various parts and prevents displacement thereof and thus a self-contained unit is provided in which the parts are retained at all times in working arrangement with one another. The disk 30 acts not only as a ball race for the bearing balls, but also to maintain the rollers in radial position and, in addition, provides a thrust plate for the shaft involved. By constructing the shell with reduced diameters at the ends, the internal shoulders 16 and 17 are provided and these act as seats for the retaining ring or ball race if it is desired to construct these parts as separate members. In such case, the shoulders control the depth of assembly of the ring or ball race and prevent the cramping of the rollers and balls during assembly of the bearing and also during installation in the mechanisms in which my invention may be used. By providing a grooved flange at the outer end of the shell for accommodating the adjacent ends of the rollers, radial displacement of the rollers is prevented when a shaft is not in position within the unit. The rollers themselves may be of any desirable type, ball point rollers being shown in Fig. 1 and shoulder type rollers being shown in Fig. 3. The reduced portions at the ends of the shell make it possible to spin the outer ends of the shell over the retaining ring or ball race for securing these members in place. My improved bearing is constructed of a minimum of parts by having each part perform a number of functions, and this also makes possible a very compact and economical bearing.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A roller and thrust bearing unit comprising a shell having an internal cylindrical surface forming a roller raceway, a series of rollers engaging said raceway, means at one end of said shell providing a groove for accommodating the adjacent ends of the rollers to prevent them from moving radially inwardly, a ball bearing race fixed to and carried by the other end of said shell, a rotatable ball bearing race slidably fitting in said shell and interposed between said rollers and said fixed bearing race, and bearing balls between said fixed race and said rotatable race, said rotatable race having means for accommodating the inner ends of said rollers and preventing the same from moving radially inwardly.

2. A roller and thrust bearing unit comprising a shell having an internal cylindrical surface forming a raceway for roller bearings, a flange at one end of the shell having a groove on its inner radial face, a fixed ball race at the other end of said shell, a complementary race rotatably and slidably fitting within said shell, balls between said races, said rotatable race having a circumferential rabbet forming with said shell a groove facing said first-mentioned groove, and a series of rollers engaging said raceway and having their opposite ends accommodated by said grooves.

3. A roller and thrust bearing unit comprising a shell having an internal cylindrical surface forming a raceway for roller bearings, an annular retaining ring secured in said shell and having a groove on its inner radial face, a fixed ball race at the other end of said shell, a race rotatably and slidably fitting within said shell, said races having complementary race grooves, balls between said races and engaging in said grooves, said rotatable race having a circumferential rabbet forming with said shell a groove facing said first-mentioned groove, and a series of rollers engaging said race surface and having their opposite ends accommodated by said grooves.

4. A roller and thrust bearing unit comprising a shell having an internal cylindrical surface and having at its opposite ends portions of reduced thickness and outwardly facing shoulders at the inner ends of said portions; an annular retaining ring located within one end of said shell, engaging the shoulder thereat and having a groove directed towards the other end of the shell; a ball race located in the other end of said shell and abutting against the shoulder thereat; the ends of said shell being bent inwardly over said retaining ring and bearing race for securing the same in place; a rotatably and slidably mounted bearing race having its periphery engaging the said internal surface and having a rabbet facing and aligned with the groove of said retaining ring; bearing balls between said bearing races; and a series of rollers engaging said cylindrical surface and having their opposite ends engaging said rabbet and groove.

5. A roller and thrust bearing unit comprising a shell having an internal cylindrical surface and having at one end a portion of reduced thickness and an outwardly facing shoulder at the inner end of said portion, said shell having at its other end a ball race integral therewith; an annular retaining ring engaging said shoulder and having a groove directed towards said other end of said shell; the adjacent end of said shell being bent inwardly over said retaining ring to secure the same in place; a rotatably and slidably mounted bearing disk having its periphery in bearing engagement with said internal surface and having a circumferential rabbet facing and aligned with the groove of said retaining ring; bearing balls between said bearing disk and said ball race; and a series of rollers engaging said cylindrical surface and having their opposite ends accommodated by said rabbet and groove.

JOHN RICHARD NORTON.